Dec. 15, 1964 W. C. DERRY 3,161,176
ANIMAL CATCHING AND HOLDING MEANS
Filed May 10, 1963
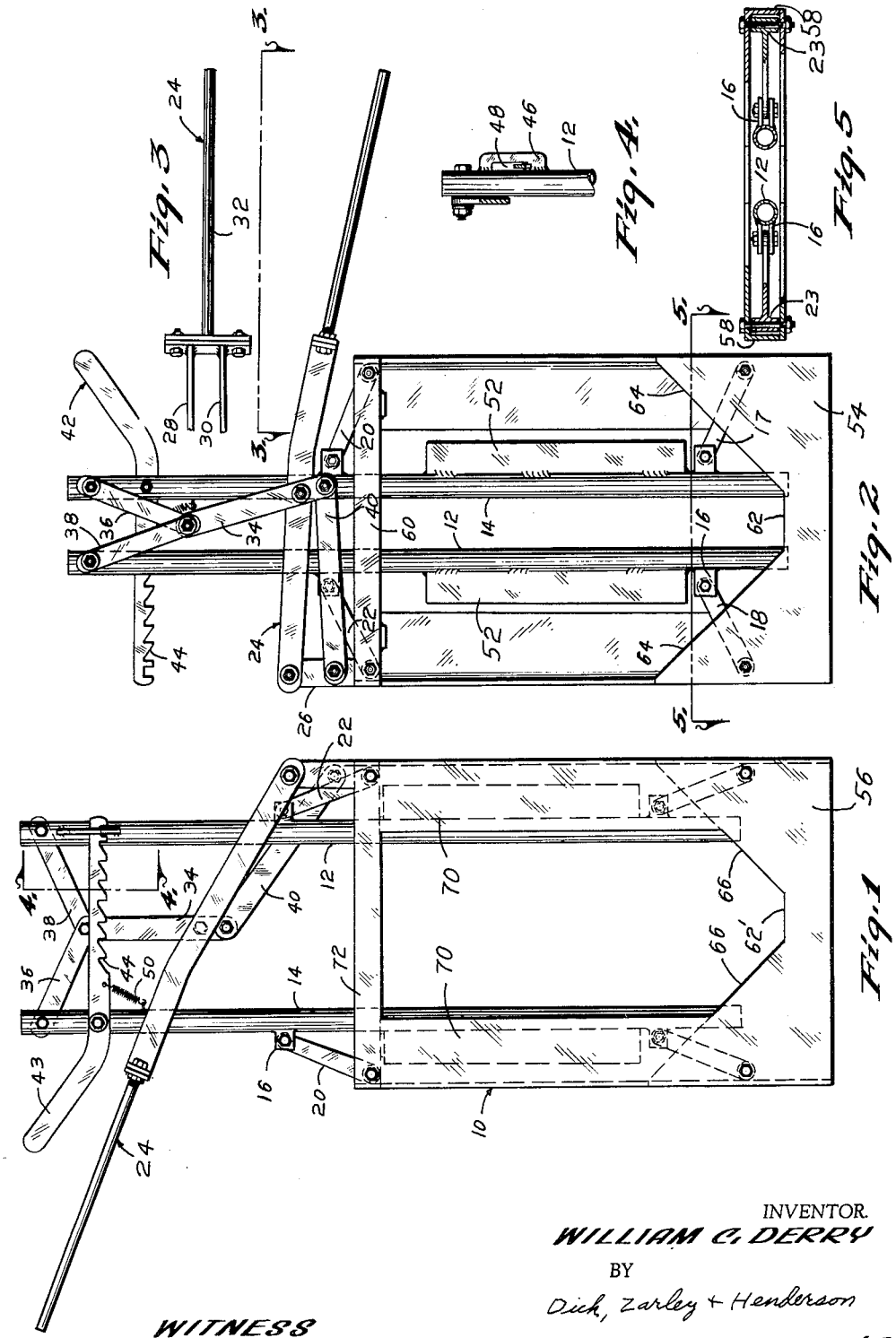
INVENTOR.
WILLIAM C. DERRY
BY
Dick, Zarley + Henderson
ATTORNEYS
WITNESS
NORMAN G. TRAVISS

# United States Patent Office 3,161,176
Patented Dec. 15, 1964

3,161,176
ANIMAL CATCHING AND HOLDING MEANS
William Chester Derry, Bagley, Iowa
Filed May 10, 1963, Ser. No. 279,548
6 Claims. (Cl. 119—99)

This invention relates to animal husbandry and more particularly to an animal catching and holding gate.

In the raising of livestock it is often desirable to hold the animal for such matters as inspection, surgery, grooming, milking, feeding and the like. Most such animal holding devices require not only a docile animal but also careful adjustment around the head or neck of the animal. Usually animal holding devices are in the form of a feeding stall, with certain portions of the wall of the feeding compartment closing around the neck of the animal. Some effort has been made to provide a gate means wherein at least one vertical hinged member swings toward or away from another vertical member. When the animal's head is extended between the two vertical portions, one is swung toward the other, thereby loosely clamping the neck of the animal between them. The chief objection to such devices is that the movable vertical member is not maintained in parallel relationship to the other member throughout its movement. This results in an objectionable wedge-shaped opening for the neck of the animal, and this open wedge area changes in shape with the movement of the member or members.

Therefore one of the principal objects of my invention is to provide an animal catching and holding device that provides at all times a true rectangular open area for the neck of the animal regardless of the relative movement of the elements of the device.

A further object of my device is to provide an easily operated animal catching and holding device.

A further object of this invention is to provide an animal catching gate that may be actuated without the operator touching or coming into direct contact with the animal.

A still further object of this invention is to provide an animal catching and holding gate that is opened or closed by the manipulation of the single hand lever.

Still further objects of my invention are to provide an animal catching and holding gate that is economical in manufacture and durable in use.

These and other obects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side view of my device in full open condition;

FIG. 2 is the other side view of the device in a closed condition;

FIG. 3 is a top plan view of the hand lever in the device taken on line 3—3 of FIG. 2, and more fully illustrates its construction;

FIG. 4 is a cross-sectional view along line 4—4 of the locking feature in the device illustrated in FIG. 1; and FIG. 5 is a horizontal cross-sectional view of the animal catching and holding means along line 5—5 as illustrated in FIG. 2.

Referring now to the drawings, the animal catching and holding means will be described in detail. A housing generally referred to by the numeral 10 has movably mounted therein jaws 12 and 14. A U-shaped element 16 is mounted at the upper and lower ends of the tubular jaws 12 and 14. The tubular jaws 12 and 14 are positioned within the housing in a common vertical plane with the U-shaped elements thereon projecting outwardly and perpendicular to the longitudinal axis of the jaws. Link members 17, 18, 20 and 22 are pivotally connected to the housing 10 and the U-shaped elements carried by the jaws 12 and 14. Each of the link members has at its outer end a tubular bearing element 23 positioned in a horizontal plane for hingedly connecting the link members to the housing side walls. The hinge connection of the link member to the housing is in a lower horizontal plane than its respective hinge connection to the jaw.

A lever generally referred to by the numeral 24 is pivotally connected to an extension 26 at one end of the housing 10 along the top thereof. The lever 24 includes parallel bars 28 and 30 pivotally mounted on opposite sides of extension 26 and having mounted at its opposite end thereof a handle 32. Intermediate of the ends of parallel bars 28 and 30 is a pivotal connection to a connecting link 34 positioned therebetween and extending vertically upwardly and pivotally connecting with links 36 and 38. Links 36 and 38, respectively, extend upwardly and outwardly and are pivotally connected to the upper end of the jaws 12 and 14. A stabilizing bar 40 is pivotally connected to the link 34 below its connection with bars 28 and 30 at one end and pivotally connected to extension 26 below its connection with bars 28 and 30 and above the top of the housing 10. A strap member 42 is pivotally connected intermediate its ends to jaw 14 with one of its ends 43 projecting outwardly and serving as a handle. The opposite end from the handle 43 has spaced notches 44 for selective engagement with an ear 46 fixedly attached to jaw 12. Ear 46 has a slot 48, the base of which engages the notches 44 carried by the strap 42. A spring 50 connected to the jaw 14 adjacent its pivotal connection therewith is connected to the strap 42 and maintains a notch thereon in engagement with the ear 46.

Within the housing 10 and on the outer sides of the jaws 12 and 14 are fixedly mounted strengthening bars 52 running substantially the length of the jaws within the housing.

The housing 10 has two sides 54 as illustrated in FIG. 2, and 56, illustrated in FIG. 1, and ends 58. A horizontal bar 60 connects the ends 58 in the plane of the side 54 along the top end of the housing 10. The side 54 in the main is open except at the lower end of the housing wherein the upper edge of the side is trough-shaped having a base portion 62 and extending upwardly and outwardly therefrom sloping portions 64. Side 56 of the housing 10 is closed along its ends by edge portion 70 which join at the bottom of the housing portion having a trough-shaped upper edge, similar to the trough-shaped upper edge of the side 54 having a base 62' and sloping portion 66. Edge portions 70 are joined at the top by bar 72.

In the operation of the animal catching and holding means the jaws 12 and 14 are adapted to move inwardly and outwardly within the housing pivoting on link members 17, 18, 20 and 22 as the lever is moved from a down position as illustrated in FIG. 2, to a raised position shown in FIG. 1. When the jaws 12 and 14 are in an inward position as shown in FIG. 2, the neck of the animal being held will be engaged. The jaws are held in this position by the strap 42 mounted on jaw 14 and held in engagement with the ear 46 mounted on the jaw 12. To release the animal, the lever 24 is raised and the jaws are spread apart. The stabilizing link element 40 serves as an anti-dead center toggle means, and the movement of the elements 17, 18, 20 and 22 assures that the jaws move inwardly and outwardly in a parallel relationship to each other. As the lever 24 is raised, the link 34 pivotally connected thereto forces links 36 and 38 to open whereby jaws 14 and 12, respectively, are moved outwardly. As the jaws 12 and 14 move outwardly they also move upwardly on their pivotal mountings to their respective link members 17, 18, 20 and 22. The jaws 12 and 14 are limited in their inward movement by link members 20 and 22 coming into engagement with stop elements 74 secured to the bars 60 and 72.

From the foregoing description it will be appreciated that the jaws 12 and 14 will always remain vertical and parallel with each other and that they may be selectively spaced apart as desired.

Some changes may be made in the construction and arrangement of my animal catching and holding means without departing from the real spirit and purpose of my invention, and it is my intention to cover by my claims, any modified forms of structure or use of mechanical equivalents which may be reasonably included within their scope.

I claim:

1. In an animal catching and holding means, comprising, in combination,
   an open housing,
   a first vertical jaw member in the opening of said housing,
   a second vertical jaw member in the opening of said housing,
   a link having one end hinged to said housing and its other end hinged to said first jaw member,
   a second link having one end hinged to said housing and its other end hinged to said first jaw member,
   a link having one end hinged to said housing and its other end hinged to said second jaw member,
   a second link having one end hinged to said housing and its other end hinged to said second jaw member,
   a third link hinged at one end to one of said jaw members,
   a third link hinged at one end to said second jaw member and its other end hinged to the free end of said first mentioned third link,
   an elongated link hinged at one end to the hinged connection of said two last mentioned third links and extending downwardly thereof,
   a link having one end hinged to said last mentioned link, and its other end hinged to said housing,
   and a lever having one end hinged to said housing and its central area pivoted to the link that is hinged to said first and second mentioned third links.

2. In an animal catching and holding means, comprising, in combination,
   an open housing,
   a first vertical jaw member in the opening of said housing,
   a second vertical jaw member in the opening of said housing,
   a link having one end hinged to said housing and its other end hinged to said first jaw member,
   a second link having one end hinged to said housing and its other end hinged to said first jaw member,
   a link having one end hinged to said housing and its other end hinged to said second jaw member,
   a second link having one end hinged to said housing and its other end hinged to said second jaw member,
   a third link hinged at one end to one of said jaw members,
   a third link hinged at one end to the other said jaw member and its other end hinged to the free end of said first mentioned third link,
   an elongated link hinged at one end to the hinged connection of said two last mentioned third links and extending downwardly thereof,
   a link having one end hinged to said last mentioned link, and its other end hinged to said housing,
   a lever having one end hinged to said housing and its central area pivoted to the link that is hinged to said first and second mentioned third links,
   a notched strap bar having one end hinged to one of said jaw members,
   and a means on the other said jaw member capable of selectively receiving the notches of said strap bar.

3. In an animal catching and holding means, comprising, in combination,
   an open housing,
   a first vertical jaw member in the opening of said housing,
   a second vertical jaw member in the opening of said housing,
   a link having one end hinged to said housing and its other end hinged to said first jaw member,
   a second link having one end hinged to said housing and its other end hinged to said first jaw member,
   a link having one end hinged to said housing and its other end hinged to said second jaw member,
   a second link having one end hinged to said housing and its other end hinged to said second jaw member,
   a third link hinged at one end to one of said jaw members,
   a third link hinged at one end to said second jaw member and its other end hinged to the free end of said first mentioned third link,
   a connecting link hinged at one end to the hinged connection of said two last mentioned third links said connecting link extending downwardly between said jaws,
   a stabilizer link having one end hinged to said connecting link, and its other end hinged to said housing,
   and a lever having one end hinged to said housing and its central area pivoted to said connecting link;
   said first mentioned third link and said second mentioned third link, each having its length extending downwardly and inwardly from said first and second jaw members respectively.

4. In an animal catching and holding means, comprising, in combination,
   an open housing,
   a first vertical jaw member in the opening of said housing,
   a second vertical jaw member in the opening of said housing,
   a link having one end hinged to said housing and its other end hinged to said first jaw member,
   a second link having one end hinged to said housing and its other end hinged to said first jaw member,
   a link having one end hinged to said housing and its other end hinged to said second jaw member,
   a second link having one end hinged to said housing and its other end hinged to said second jaw member,
   a third link hinged at one end to one of said jaw members,
   a third link hinged at one end of said second jaw member and its other end hinged to the free end of said first mentioned third link,
   a connecting link hinged at one end to the hinged connection of said two last mentioned third links, said connecting link extending downwardly between said jaws,
   a stabilizer link having one end hinged to said connecting link, and its other end hinged to said housing,
   said first mentioned third link and said second mentioned third link, each having its length extending downwardly and inwardly from said first and second jaw members respectively,
   and a lever having one end hinged to one side of said housing and extending transversely thereof with its central area pivoted to said connecting link, said lever terminating in a handle portion outwardly of the opposite side of said housing from said one side hinged to said one end of said lever.

5. The structure of claim 4 wherein said stabilizer link and said lever are further defined as each being hinged to said connecting link closely adjacent each other and hingedly connected to said one side of said housing whereby said stabilizer link and said lever are maintained in substantially parallel relation to each other at all times.

6. In an animal catching and holding means, comprising, in combination,
an open housing,
a first vertical jaw member in the opening of said housing,
a second vertical jaw member in the opening of said housing,
a link having one end hinged to said housing and its other end hinged to said first jaw member,
a second link having one end hinged to said housing and its other end hinged to said first jaw member,
a link having one end hinged to said housing and its other end hinged to said second jaw member,
a second link having one end hinged to said housing and its other end hinged to said second jaw member,
a third link hinged at one end to one of said jaw members,
a third link hinged at one end to said second jaw member and its other end hinged to the free end of said first mentioned third link,
a connecting link hinged at one end to the hinged connection of said two last mentioned third links, said connecting link extending downwardly between said jaws,
said first mentioned third link and said second mentioned third link, each having its length extending downwardly and inwardly from said first and second jaw members respectively,
and a lever having a pair of spaced apart parallel bars pivotally connected to one side of said housing and extending transversely thereof with their central area pivoted to said connecting link, one of said bars extending on one side of said jaw members and the other bar extending on the other side of said jaw members, and a handle means joining the free end of said bars on the opposite side of each of said jaws from said one side of said housing, said handle extending outwardly of said jaw members adjacent said opposite side of said housing.

References Cited by the Examiner
UNITED STATES PATENTS

| | | | |
|---|---|---|---|
| 497,163 | 5/93 | Bowman et al. | 119—99 |
| 1,323,072 | 11/19 | Kuhlman | 119—98 |
| 1,363,054 | 12/20 | Poppenga | 119—98 |
| 1,514,429 | 11/24 | Burmester | 119—98 |
| 2,234,366 | 3/41 | Carter | 119—98 |
| 2,508,549 | 5/50 | Stephenson | 119—99 |
| 2,591,191 | 4/52 | Osmetti | 119—99 |

SAMUEL KOREN, *Primary Examiner.*
ALDRICH F. MEDBERY, *Examiner.*